United States Patent
Tallon

(10) Patent No.: US 9,554,568 B1
(45) Date of Patent: Jan. 31, 2017

(54) SYSTEM AND METHOD FOR BEDBUG ERADICATION

(71) Applicant: Jay Tallon, Redondo Beach, CA (US)

(72) Inventor: Jay Tallon, Redondo Beach, CA (US)

(*) Notice: Subject to any disclaimer, the term of this patent is extended or adjusted under 35 U.S.C. 154(b) by 149 days.

(21) Appl. No.: 13/868,809

(22) Filed: Apr. 23, 2013

Related U.S. Application Data

(60) Provisional application No. 61/637,236, filed on Apr. 23, 2012.

(51) Int. Cl.
*A01M 13/00* (2006.01)
*F25B 15/00* (2006.01)

(52) U.S. Cl.
CPC .............. *A01M 13/00* (2013.01); *F25B 15/00* (2013.01)

(58) Field of Classification Search
CPC ...... A01M 1/24; A01M 1/245; A01M 1/2094; A01M 1/2022; A01M 1/2033
USPC ........................................ 43/132.1, 124, 123
See application file for complete search history.

(56) References Cited

U.S. PATENT DOCUMENTS

| | | | |
|---|---|---|---|
| 5,349,778 A * | 9/1994 | Chu | A01M 1/2094 43/124 |
| 5,768,907 A * | 6/1998 | Lee | 62/293 |
| 6,612,067 B2 | 9/2003 | Topp | |
| 2006/0064924 A1 | 3/2006 | Lee | |
| 2007/0084105 A1 | 4/2007 | Lindsay et al. | |
| 2007/0283986 A1* | 12/2007 | Baum | 134/201 |
| 2008/0014111 A1* | 1/2008 | Hedman | 422/3 |
| 2010/0071258 A1 | 3/2010 | Molnar et al. | |
| 2010/0212088 A1 | 8/2010 | Deighan | |

OTHER PUBLICATIONS

"FAQ—leaving stuff out to freeze" 2007.*

* cited by examiner

*Primary Examiner* — Thien Thanh Pham
(74) *Attorney, Agent, or Firm* — Tope-McKay & Associates

(57) ABSTRACT

Described herein is a refrigeration system for bedbug eradication. The refrigeration system comprises a generator, a condensing unit, and a portable evaporating and blowing unit connected with the condensing unit for transporting into a bedbug-infested room of a building. Temperature sensors are used for monitoring an ambient temperature in the bedbug-infested room to ensure that the temperature drops to a predetermined temperature to kill the bedbugs and their eggs. Moisture in the bedbug-infested room is removed with a dehumidifier prior to cooling down the bedbug-infested room with the evaporating and blowing unit.

12 Claims, 7 Drawing Sheets

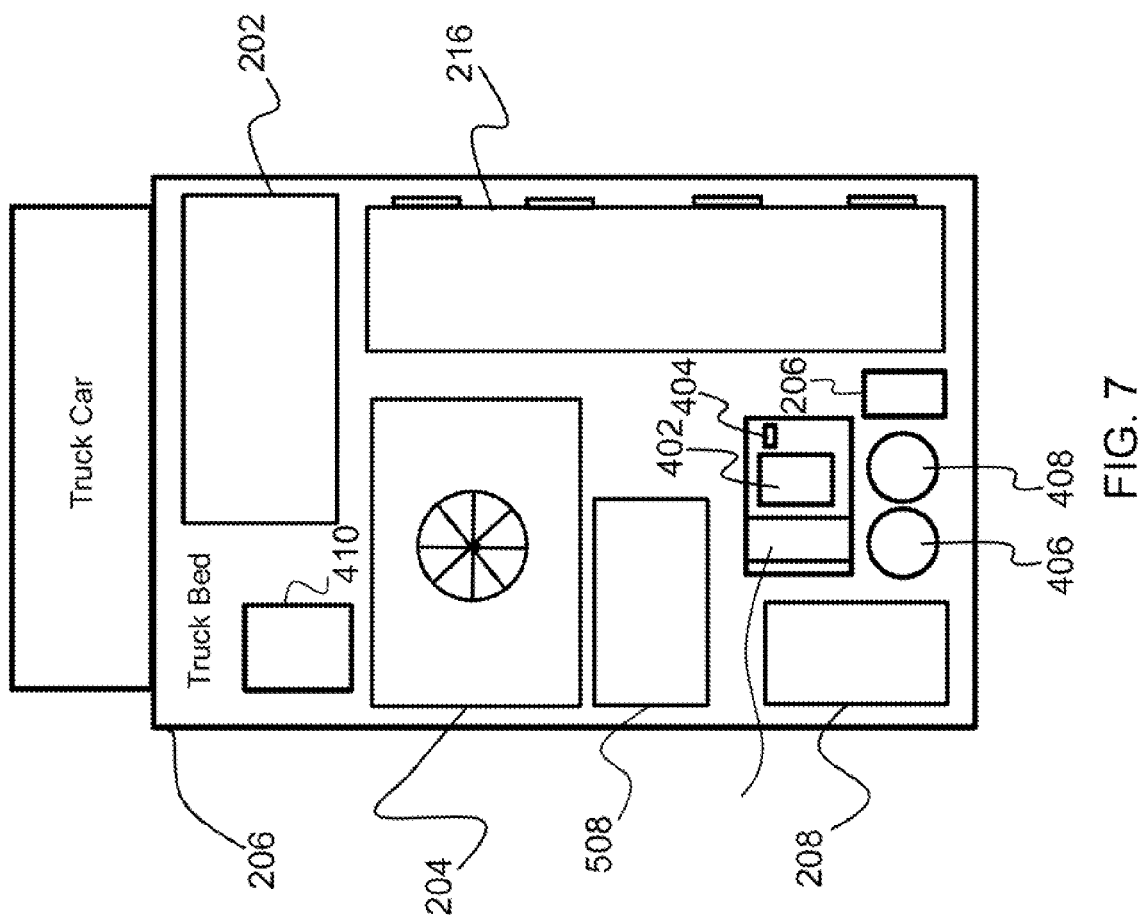

SYSTEM AND METHOD FOR BEDBUG ERADICATION

CROSS-REFERENCE TO RELATED APPLICATIONS

This is a Non-Provisional patent application of U.S. Provisional Application No. 61/637,236, filed in the United States on Apr. 23, 2012, entitled, "Method for Bedbug Eradication."

BACKGROUND OF THE INVENTION (1) Field of Invention

The present invention relates to a system and method for bedbug eradication and, more particularly, to a system and method for bedbug eradication which uses a transportable refrigeration system.

(2) Description of Related Art

Bedbugs are small parasitic insects which feed on warm-blooded animals. While bedbugs were largely eradicated in the 1940s, they have recently increased in prevalence. Bedbug infestation is a particular problem in places with high turn-over of night time guests, such as hotels and hospitals.

Several methods exist for terminating bedbugs. Pesticides are often used to kill bedbugs; however, the insects are developing resistance to the pesticides used. Additionally, temperature-dependent methods for terminating bedbugs exist, since bedbugs are sensitive to extreme temperatures. Existing systems include heating units, cooling units placed in bedding, and a cooling unit with a fan and hose for directing a cold stream of air at insects and other pests.

A continuing need exists for a system and method for bedbug eradication which utilizes a transportable refrigeration system for pumping dry, cold air into designated structures while monitoring the temperature of key areas to ensure complete eradication of the bedbugs.

SUMMARY OF THE INVENTION

The present invention relates to a system and method for bedbug eradication. The system comprise a generator, a condensing unit, and a portable evaporating and blowing unit connected with the condensing unit for transporting into a bedbug-infested room of a building. A plurality of temperature sensors is positioned in locations in the bedbug-infested room where bedbugs are commonly found to nest and are used to monitor an ambient temperature in the bedbug-infested room.

In another aspect, the refrigeration system comprises a dehumidifier.

In another aspect, the system further comprises at least one line holder for securing at least one line for connecting the portable evaporating and blowing unit with the condensing unit.

In another aspect, the at least one line holder is a reel and the at least one line comprises a set of lines comprising at least one power line and at least one refrigeration line.

In another aspect, the refrigeration system further comprises a portable cable reel and a portable cable for transporting to a plurality of levels in the building, wherein the portable cable is connected with the portable evaporating and blowing unit.

In another aspect, the condensing unit is a water-cooled condensing unit.

The method for bedbug eradication, comprising acts of pumping cold air from a portable refrigeration unit into a bedbug-infested room of a building; lowering an ambient temperature in the bedbug-infested room to a predetermined temperature; and monitoring the ambient temperature in the bedbug-infested room using temperature sensors.

In another aspect, the method further comprises an act of using a dehumidifier to remove moisture from the bedbug-infested room.

In another aspect, the bedbug-infested room comprises a plurality of openings, and the method further comprises an act of sealing each opening prior to pumping cold air into the room.

In another aspect, the method further comprises an act of positioning the temperature sensors in locations in the bedbug-infested room where bedbugs are commonly found to nest.

In another aspect, the method further comprises an act of connecting the portable refrigeration unit to a condensing unit positioned on a vehicle.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7 is a top-view illustration of a flat bed truck and an example arrangement of components of the refrigeration system according to principles of the present invention.

DETAILED DESCRIPTION

Figure 1:
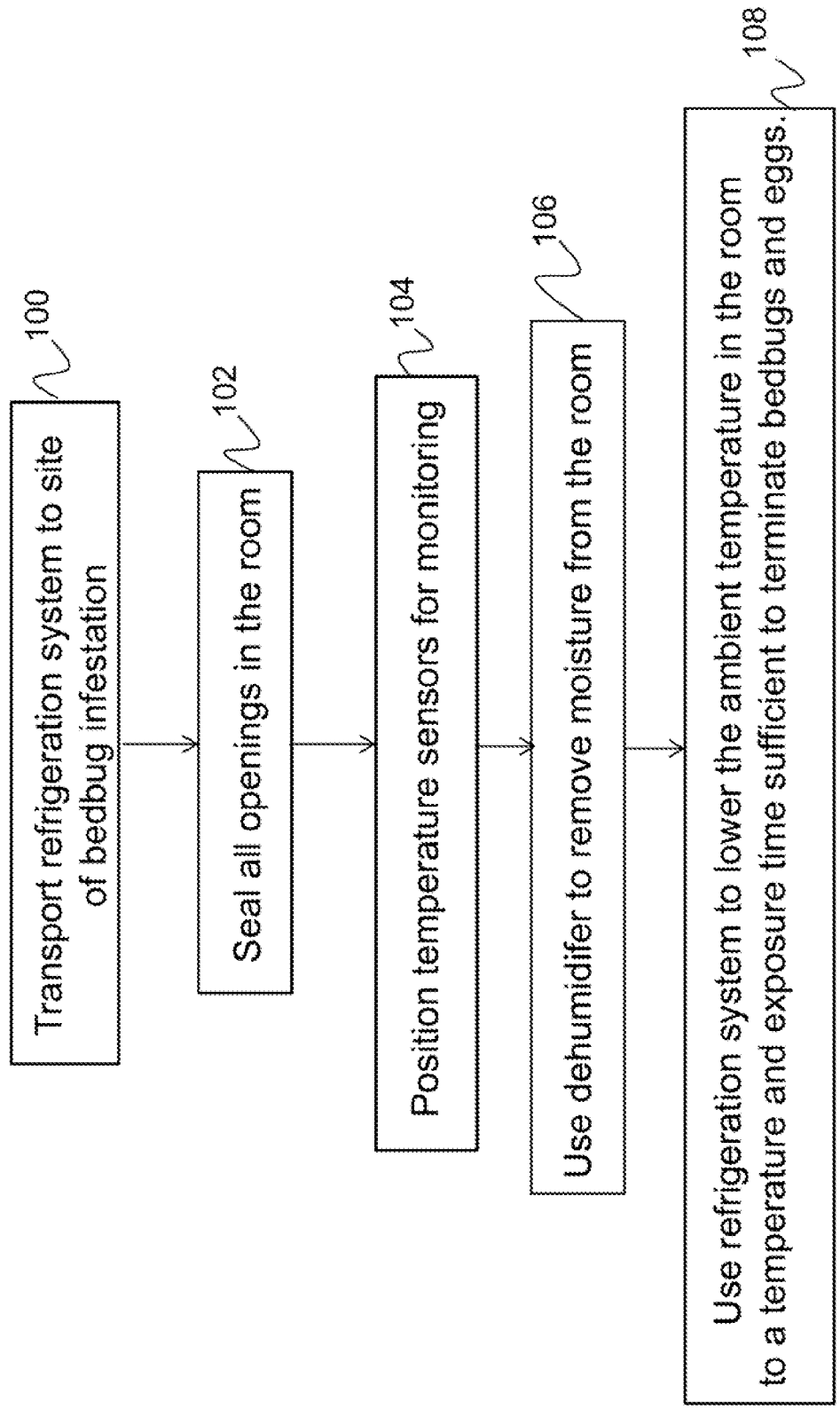
FIG. 1 illustrates a method of bedbug eradication according to the principles of the present invention.

The present invention relates to a system and method for bedbug eradication and, more particularly, to a system and method for bedbug eradication which uses a transportable refrigeration system. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Specific Details

The present invention relates to a system and method for bedbug eradication. Specifically, the invention comprises a system and method for using a transportable refrigeration unit to cool an entire area, such as a motel/hotel room, to a temperature low enough to kill bedbugs in each of the life cycle stages, including egg, nymph, and adult. In contrast to spot treatments which are currently used, cooling an entire area (e.g., hotel room) enables more complete extermination of the bedbugs. Furthermore, cold temperatures have less adverse impacts on housing materials than typical processes which utilize heat or chemicals.

FIG. 1 is a flow diagram illustrating the method for bedbug eradication according to principles of the present invention. In a first step 100, a transportable refrigeration system, which will be described in further detail below, is transported to a site of bedbug infestation, such as a motel/hotel room. In a second step 102, all openings in the room are sealed with insulating blankets and tape to prevent hot air from coming into the room and cool air from escaping from the room. In a third step 104, temperature sensors, such as thermometers, are positioned throughout the room to monitor changes in temperature and ensure that the temperature of the room has dropped to a sufficient level. In a fourth step 106, a dehumidifier is placed within the room and used to remove moisture from the room. In a fifth step 108, an evaporator/blower refrigeration unit, which has been transported into the room, is turned on to lower the ambient temperature in the room to a level cold enough to kill bedbugs at all stages of development, as monitored by the temperature sensors. Alternatively, refrigeration of the room may start during the dehumidification process rather than a separate step so that refrigeration and dehumidification occur concurrently. Furthermore, the order of the aforementioned steps could be reordered, as needed, for a particular application or situation. For instance, dehumifying (either partial or complete) may occur prior to complete sealing of openings.

In a desired aspect, the temperature in the room is lowered to approximately −10 degrees Fahrenheit. However, as can be appreciated by one skilled in the art, this temperature is merely provided as an example, and any temperature that is sufficiently low to kill bedbugs and their eggs could be utilized. Additionally, the killing of the bedbugs is dependent on the duration of exposure. Colder temperatures are expected to kill bedbugs more quickly. Therefore, a combination of temperature and duration of exposure will be selected that is appropriate for the project, which will be dependent on various factors specific to the given site, such as area of the room or number of openings in the room.

Figure 2:
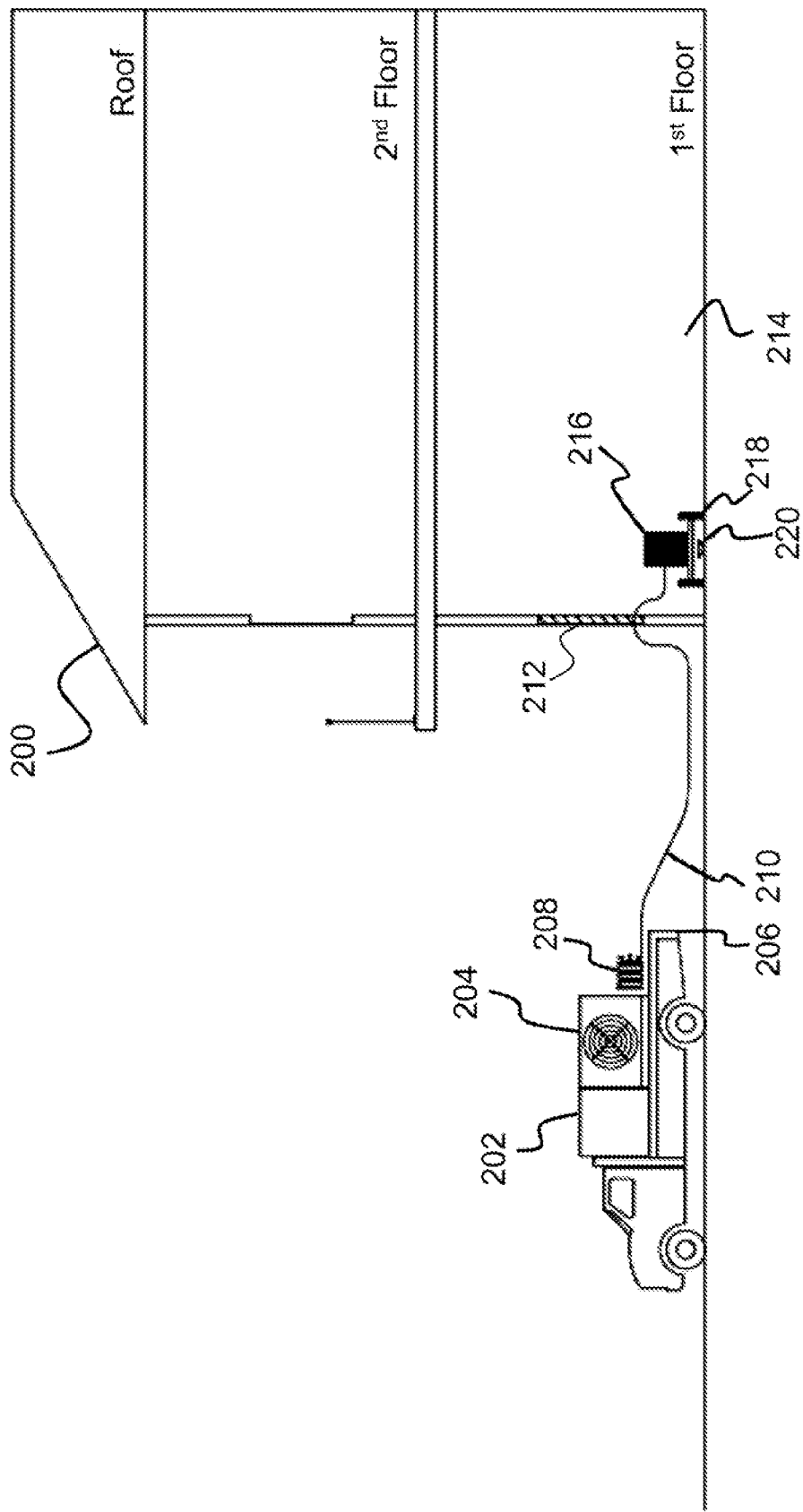
FIG. 2 is an illustration of the system for bedbug eradication implemented in a typical motel according to the principles of the present invention.

FIG. 2 illustrates the system for bedbug eradication according to the present invention, implemented in a typical motel 200. The system comprises a generator 202 and a condensing unit 204 positioned on a vehicle, such as a flat bed truck 206. As a non-limiting example, the flat bed truck 206 is a 1.5 ton cab and chassis with rear dual wheels. Alternatively, the refrigeration system could be transported on a trailer attached to a vehicle, or any equipment suitable for transporting the components of the refrigeration system. As another option, a large building/facility may consider a permanent system on site for bedbug treatment. In this application, components of the refrigeration system described herein (e.g., generator, condensing unit) could be permanently installed at a site for periodic use at the building/facility.

The generator 202 is connected with the condensing unit 204 and functions to power the condensing unit 204. In a desired aspect, the generator 202 is a diesel generator, such as a generator from the Quiet Diesel™ series by Cummins Onan located at 1400 73rd Ave. NE Fridley, Minn. 55432. In this example, the condensing unit 204 is a typical condenser unit that has a heat exchange section to cool down and condense incoming refrigerant vapor into liquid, a compressor to raise the pressure of the refrigerant and move it along, and a fan for blowing outside air through the heat exchange section to cool the refrigerant inside. In the condensing unit 204, refrigerant vapor is compressed and forced through the heat exchange section (e.g., coil), which condenses the refrigerant into a liquid, thereby rejecting the heat previously absorbed from the cooled area.

A hose reel 208 holding at least one line 210 is also positioned on the flat bed truck 206. As can be appreciated by one skilled in the art, the at least one line 210 may be secured by any type of line holder and is not limited to a reel. In a desired aspect, the at least one line 210 comprises a set of lines comprising a flexible refrigerant liquid line, a flexible refrigerant suction line, control wiring, and a power cord to power an evaporator/blower unit 216. The inlet to the compressor in the condensing unit 204 is the refrigerant suction line. It brings low pressure vapor into the compressor. After the compressor compresses the refrigerant into a high pressure vapor, it removes it to the refrigerant liquid line. The refrigerant liquid line pumps refrigerant into an evaporator/blower unit 216 located in the area to be cooled, where low pressure causes the refrigerant to evaporate into a vapor and take heat with it back to the condensing unit through the refrigerant suction line.

In this example, the at least one line 210 is routed through, for instance, a window 212 of a room 214 on a first floor of the motel 200. Depending on the particular structure of the building, the at least one line 210 could alternatively be routed through an indoor or outdoor door. Refrigerant piping (refrigerant liquid line and refrigerant suction line) is routed as straight as possible to avoid unnecessary bends and elbows. As shown in FIG. 2, the at least one line 210 is fed through the window 212 and connected with the evaporator/blower unit 216 located at the interior of one of the rooms 214.

The evaporator/blower unit 216 is placed on a dolly or rollable cart 218 (e.g., hand cart) that allows easy transportation of the evaporator/blower unit 216 from the flat bed truck 206 to hallways, elevators, stairwells, and, finally, rooms within a bedbug-infested building. Therefore, the evaporator/blower unit 216 is small enough in size to fit into a small elevator and into a standard size doorway. Additionally, the evaporator/blower unit 216 is light enough in weight that it can easily be moved with a small dolly or a rolling cart from room to room (e.g., approximately 250 pounds). In the example illustrated in FIG. 2, a receiving element 220 (e.g., tray) is positioned beneath the rollable cart 218 and directly below an evaporator condensate drain of the evaporator/blower unit 216 to collect any dripping fluids.

Figure 3:
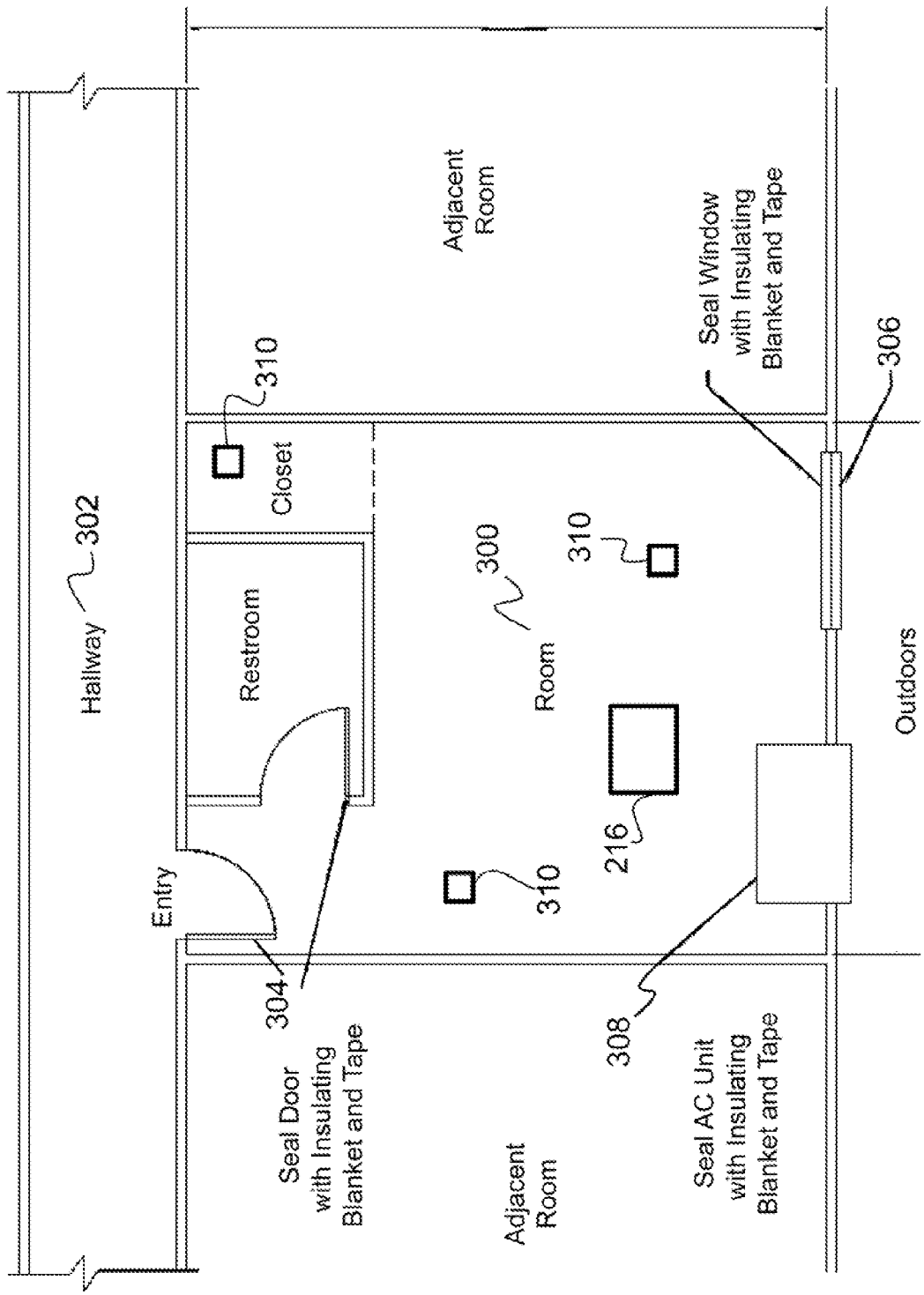
FIG. 3 illustrates a typical motel room layout and the components of the refrigeration system within the motel room according to principles of the present invention.

FIG. 3 illustrates a typical motel room layout and the elements of the refrigeration system described herein within the motel room. As can be appreciated by one skilled in the art, the illustrated room 300 could also be a room in a home or business. Prior to cooling, all openings/outlets in the room 300 are then sealed. Openings include, but are not limited to, an entry 304 (i.e., door), window 306 (or sliding glass door), and an air conditioning (AC) unit 308 in the room 300. Openings in the room 300 are sealed with insulating blankets and tape to prevent any cold air from escaping and any hot air from entering the room 300.

Temperature monitors 310 (e.g., thermometers) are placed at various locations in the room 300 to assess cooling down of the room. The temperature monitors 310 will be utilized to ensure 100% kill rate of bedbugs at all stages of bedbug development from egg to adult in all key locations where bedbugs are most commonly found to nest. Non-limiting examples of key locations include mattresses, bedding, bed frames, seating, furniture, clothing, and luggage.

Then, a dehumidifier is used to draw moisture out of the room 300 to prevent sweating of materials inside the room or any associated damage. Dehumidifying may occur either before refrigeration or at the same time as refrigeration of the room 300. The dehumidifier may be positioned inside the room or in a hallway 302 outside the room 300. As a non-limiting example, a model HI-E DRY 195 dehumidifier produced by Therma-Stor™, located at 4201 Lien Rd., Madison, Wis. 53704, may be used in the present invention.

The generator, the condensing unit, and the evaporator/blower unit 216 are powered on and run until the room 300 is sufficiently cooled to approximately −10 degrees F., which (as a non-limiting example) can be done in approximately one hour. After cool-down is complete, the insulating blankets and tape are removed, and all equipment, including the evaporator/blower unit 216, is easily transported out of the room 300 on the rolling cart. The process can then begin in another room or area of the building, as required. Finally, the evaporator/blower unit 216 can be transported and placed back on the flat bed truck or other transport equipment.

Figure 4:
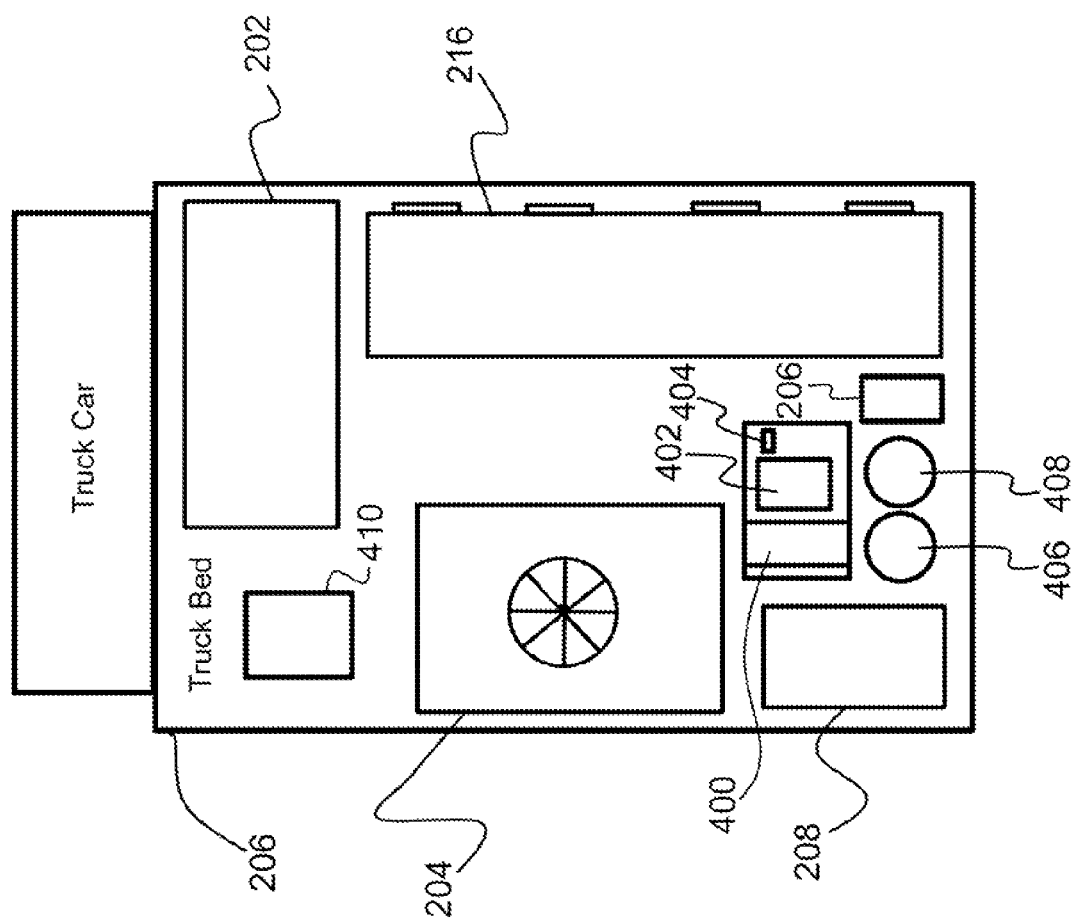
FIG. 4 is a top-view illustration of a flat bed truck and an example arrangement of components of the refrigeration system according to principles of the present invention.

FIG. 4 is a top-view illustration of the flat bed truck 206 and a non-limiting example of the arrangement of components of the refrigeration system of the present invention for the motel example described in FIGS. 2 and 3. As described above, within the flat bed truck 206 are positioned the generator 202, the evaporator/blower unit 216, the condensing unit 204, and the hose reel 208. Additional components of the refrigeration system may include a refrigerant recovery unit 400, a refrigerant vacuum pump 402, and a refrigerant charging manifold 404 (i.e., gauges) housed within, for instance, and aluminum box for recovering the used refrigerant. Furthermore, a refrigerant recovery tank 406 and a spare refrigerant tank 408 may be stored on the flat bed truck 206 in addition to a dehumidifier 410. Additionally, the rollable cart 218 is placed on the flat bed truck 206 to transport components of the refrigeration system to the site.

Figure 5:
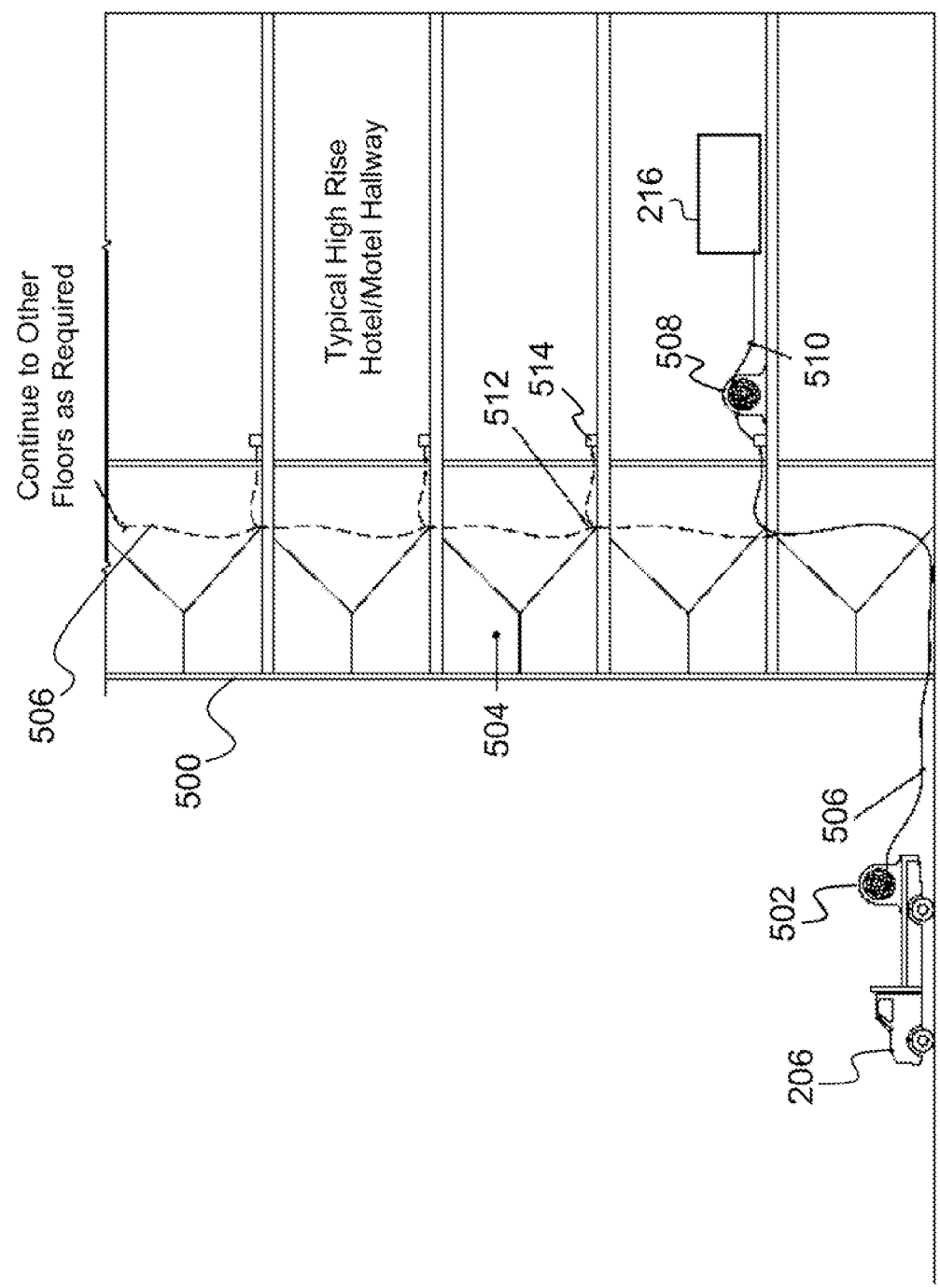
FIG. 5 an illustration of the system for bedbug eradication implemented in a typical high-rise building according to the principles of the present invention.

FIG. 5 illustrates the system for bedbug eradication according to the present invention, implemented in a high rise building 500 (e.g., hotel). In this non-limiting example, a power cable reel 502 is positioned on the flat bed truck 206. However, any type of cable/line/wire holder could be used. The flat bed truck 206 is parked near a stairwell 504 closest to where the bedbug eradication will occur. A power cable 506 is wound around the power cable reel 502 and connected with the generator on the flat bed truck 206. The power cable 506 extends to other floors, as required. Furthermore, a portable cable reel 508 holding a portable cable 510 is located on the floor that is being treated for bedbugs. The portable cable 510 is connected with the evaporator/blower unit 216 and a water-cooled condensing unit (shown in FIG. 6), as opposed to the condensing unit with a fan illustrated in FIG. 2. Additionally, at least one cable support 512 is located at each level of the high rise building 500 to secure the portable cable 510. Furthermore, a portable junction box 514 can be set on each level to provide a power source from the power cable 506 to the particular building level.

Figure 6:
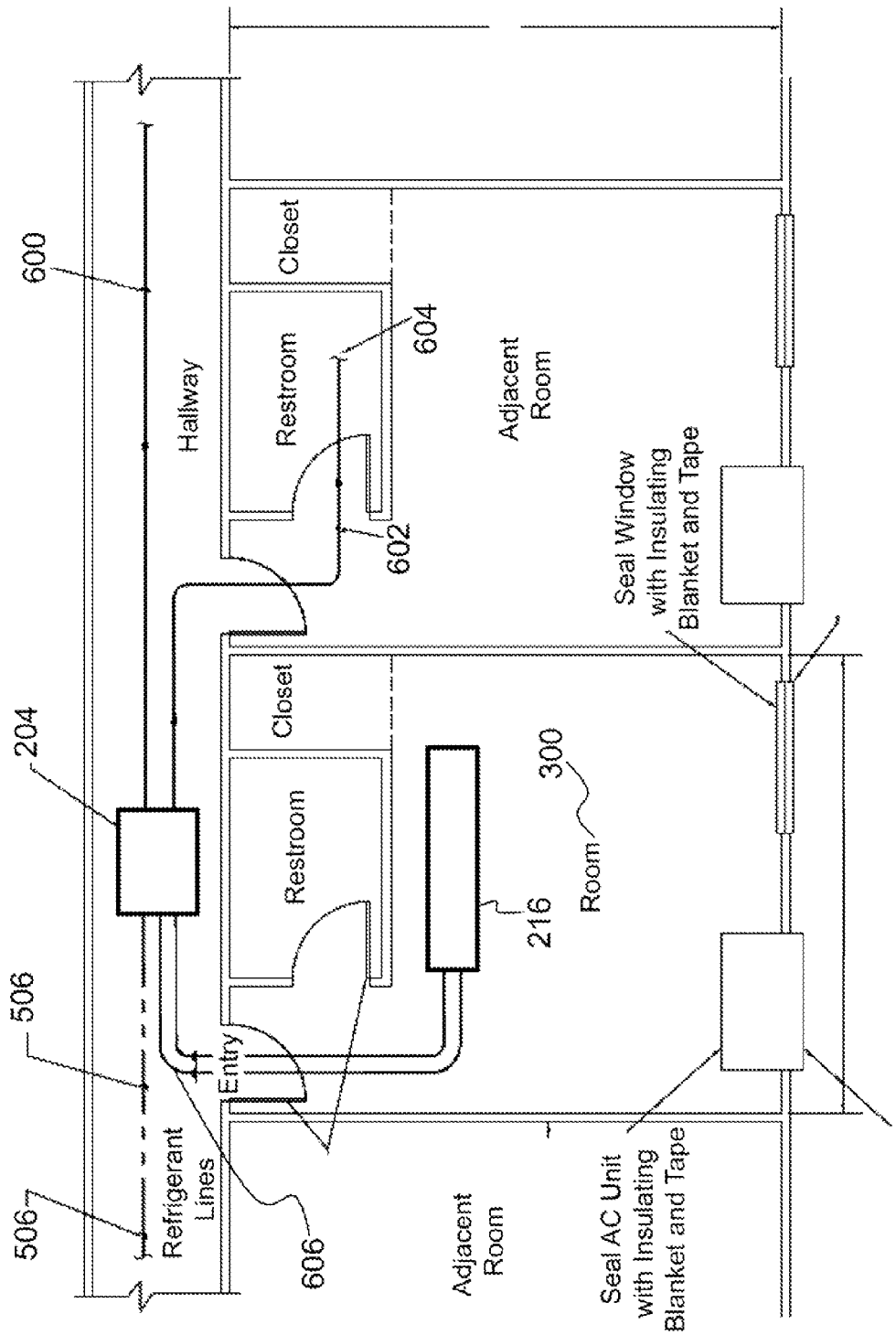
FIG. 6 illustrates a typical high-rise building room layout and the components of the refrigeration system within the room according to principles of the present invention.

FIG. 6 is a diagram of a typical room 300 in a high rise building; however, the illustrated arrangement could also be used in a single level building. In this non-limiting example, a water-cooled condensing unit 204 is utilized. Water (e.g., 50 degrees F.) from the high rise building 600 flows into the condensing unit 204 during its operation in order to cool the condensing unit 204. As shown, condenser water 602 leaves the condensing unit 204 and empties into a bathtub drain in a bathroom 604. Alternatively, the condenser water 602 could drain into a shower, sink, or out a window of the room 300 depending on what is most convenient for the particular room 300. Refrigerant lines 606 connect the condensing unit 204 and the evaporator/blower unit 216. The method of operation is the same as detailed above with the room 300 first being treated with a dehumidifier, followed by sealing of all openings, and powering on the evaporator/blower unit 216.

FIG. 7 is a top-view illustration of the flat bed truck 206 and a non-limiting example of the arrangement of components of the refrigeration system of the present invention for the high rise building example described in FIGS. 5 and 6. As described above, within the flat bed truck 206 are positioned the generator 202, the evaporator/blower unit 216, the condensing unit 204, and the hose reel 208. The arrangement may also include the portable cable reel 508 Additional components of the refrigeration system may include a refrigerant recovery unit 400, a refrigerant vacuum pump 402, and a refrigerant charging manifold 404 (i.e., gauges) housed within, for instance, and aluminum box for recovering the used refrigerant. Furthermore, a refrigerant recovery tank 406 and a spare refrigerant tank 408 may be stored on the flat bed truck 206 in addition to a dehumidifier 410. Additionally, the rollable cart 218 is placed on the flat bed truck 206 to transport components of the refrigeration system to the site.

What is claimed is:
1. A method for bedbug eradication, comprising acts of:
   positioning a generator and a connected condensing unit outside a building to be treated for bedbug infestation;

positioning a line holder proximate the generator and the condensing unit, wherein the line holder secures a line that pumps refrigerant from the condensing unit outside the building into a portable evaporator and blower unit located in a first bedbug-infested room inside the building;

eradicating bedbugs in the entire first bedbug-infested room inside the building by;

pumping cold air from the portable evaporation and blower unit into the entire first bedbug-infested room inside the building; and lowering an ambient temperature in the entire first bedbug-infested room to a predetermined temperature sufficient to kill bedbugs at all stages of development while monitoring the ambient temperature in the entire first bedbug-infested room using a plurality of temperature sensors, wherein the predetermined temperature is selected from a range of a temperatures between −10 degrees and −1 degree Fahrenheit; and transporting the portable evaporation and blower unit to any other bedbug-infested rooms inside the building and eradicating bedbugs in the other bedbug-infested rooms inside the building.

2. The method as set forth in claim 1, further comprising an act of using a dehumidifier to remove moisture from each of the bedbug-infested rooms.

3. The method as set forth in claim 2, wherein the bedbug-infested rooms each comprises a plurality of openings, and wherein the method further comprises an act of sealing each opening prior to pumping cold air into the room.

4. The method as set forth in claim 3, further comprising an act of positioning the plurality of temperature sensors in locations in each of the bedbug-infested rooms where bedbugs are commonly found to nest.

5. The method as set forth in claim 4, further comprising an act of connecting the portable evaporation and blower unit to the condensing unit positioned on a vehicle.

6. The method as set forth in claim 3, further comprising the act of sealing each of the plurality of openings with at least one insulating blanket.

7. The method as set forth in claim 1, further comprising an act of connecting the portable evaporation and blower unit to the condensing unit positioned on a vehicle.

8. The method as set forth in claim 1, further comprising an act of positioning the plurality of temperature sensors in locations in each of the bedbug-infested rooms where bedbugs are commonly found to nest.

9. The method as set forth in claim 1, further comprising an act of positioning the line holder on a vehicle located outside of the building.

10. The method as set forth in claim 1, further comprising an act of positioning the portable evaporation and blower unit on a rollable cart for transporting the portable evaporation and blower unit, the rollable cart having a receiving element located beneath the rollable cart for collecting any dripping fluids from the portable evaporation and blower unit.

11. The method as set forth in claim 1, wherein the method further comprises acts of:

positioning a power cable holder, holding a power cable, on a vehicle outside the building, wherein the power cable is connected with the generator;

positioning at least one portable cable holder, holding a portable cable connected with the power cable, on each level of the building, wherein the portable cable is connected with the portables evaporation and blower unit when in use; and positioning at least one cable support on each level of the building to secure the portable cable.

12. A method for bedbug eradication, comprising acts of:

positioning a water-cooled condensing unit inside a building to be treated for bedbug infestation, wherein water from the building flows into the condensing unit during its operation to cool the condensing unit;

a pumping refrigerant from the condensing unit into a portable evaporation and blower unit located in a first bedbug-infested room inside the building;

eradicating bedbugs in the entire first bedbug-infested room inside the building by:

pumping cold air from the portable evaporation and blower unit into the entire first bedbug-infested room inside the building; and lowering an ambient temperature in the entire first bedbug-infested room to a predetermined temperature sufficient to kill bedbugs at all stages of development while monitoring the ambient temperature in the entire first bedbug-infested room using a plurality of temperature sensors wherein the predetermined temperature is selected from a range of temperatures between −10 degrees and −1 degree Fahrenheit; and a transporting the portable evaporation and blower unit to any other bedbug-infested rooms inside the building and eradicating bedbugs in the other bedbug-infested rooms inside the building.

* * * * *